(12) United States Patent
Nadd et al.

(10) Patent No.: US 7,183,834 B2
(45) Date of Patent: Feb. 27, 2007

(54) METHOD AND APPARATUS FOR DRIVING A POWER MOS DEVICE AS A SYNCHRONOUS RECTIFIER

(75) Inventors: Bruno Charles Nadd, Lourmarin (FR); Xavier de Frutos, Venelles (FR); Andre Mourrier, Sainte Tulle (FR)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/683,608

(22) Filed: Oct. 10, 2003

(65) Prior Publication Data

US 2004/0125627 A1    Jul. 1, 2004

Related U.S. Application Data

(60) Provisional application No. 60/418,417, filed on Oct. 11, 2002.

(51) Int. Cl.
*H03K 17/62* (2006.01)
(52) U.S. Cl. ........................ 327/404; 327/494
(58) Field of Classification Search ................ 327/205, 327/206, 403, 404, 427, 494, 495, 496, 497
See application file for complete search history.

(56) References Cited

U.S. PATENT DOCUMENTS

| | | | | |
|---|---|---|---|---|
| 4,417,164 A | * | 11/1983 | Edlund | 327/603 |
| 5,506,527 A | * | 4/1996 | Rudolph et al. | 327/104 |
| 6,469,564 B1 | * | 10/2002 | Jansen | 327/365 |

* cited by examiner

*Primary Examiner*—Jeffrey Zweizig
(74) *Attorney, Agent, or Firm*—Ostrolenk, Faber, Gerb & Soffen, LLP

(57) ABSTRACT

A synchronous rectifier comprising a MOSFET device, and a gate driver for driving the gate of the MOSFET device, the MOSFET device comprising first and second MOSFET transistors coupled with their drain-source paths in parallel to receive an alternating current waveform for rectification by the drain-source paths of the MOSFET transistors, the first transistor having a low Rdson and the second transistor having a high Rdson whereby the apparent Rdson of the MOSFET device is increased when the current through the MOSFET device is below a threshold thereby enabling zero crossing detection.

16 Claims, 5 Drawing Sheets

METHOD AND APPARATUS FOR DRIVING A POWER MOS DEVICE AS A SYNCHRONOUS RECTIFIER

CROSS REFERENCE TO RELATED APPLICATION

The present application claims the benefit and priority of U.S. Provisional Application Ser. No. 60/418,417 filed Oct. 11, 2002 and entitled "Improved Method to Drive a Power MOS Device As A Synchronous Rectifier", the entire disclosure of which is incorporated by reference herein.

BACKGROUND OF THE INVENTION

The present invention relates to methods and apparatus for driving a power semiconductor device, and in particular, to a method and apparatus for driving a power MOS device as a synchronous rectifier.

Figure 1:
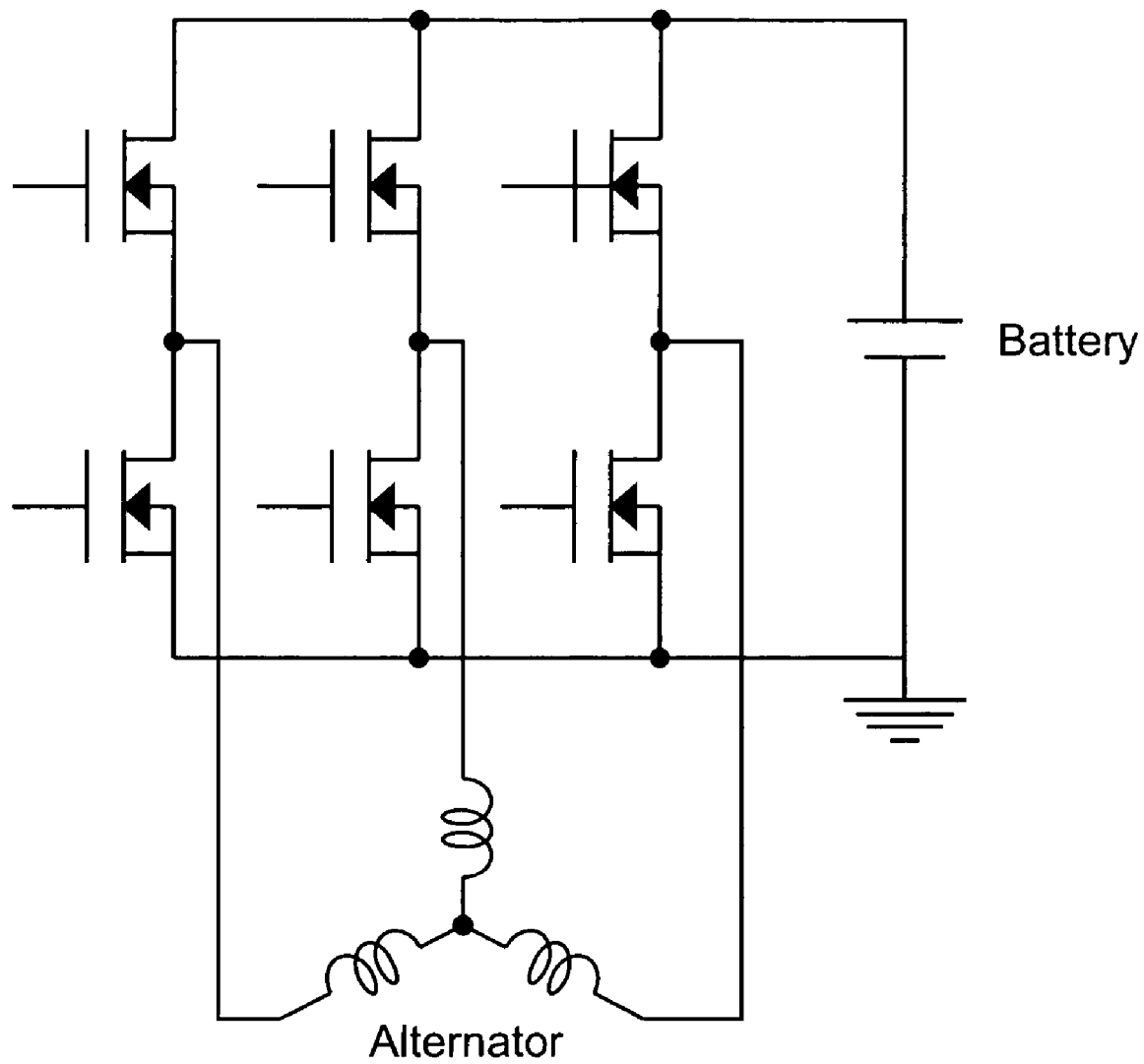

Driven by the increasing need for improved efficiency and made practical by the availability of ultra low Rdson power MOSFETS, the replacement of PN or Schottky rectifying diodes by MOSFETs is becoming popular in low voltage applications. A typical example is the automobile alternator. By replacing the diode rectifying bridge (which drops more than two volts) by suitably driven MOSFETs, one can gain 10 to 15% on the overall alternator efficiency. FIG. 1 shows such a prior art system employing MOSFETs in place of diodes.

One of the problems for the designer of such a system is to find a way to drive the FETs in a way that mimics the behavior of diodes, but without the limitation of diodes.

An object of the present invention is to provide a way to drive the rectifying MOSFETs which does not suffer from the limitations of the prior art.

Figure 2A:
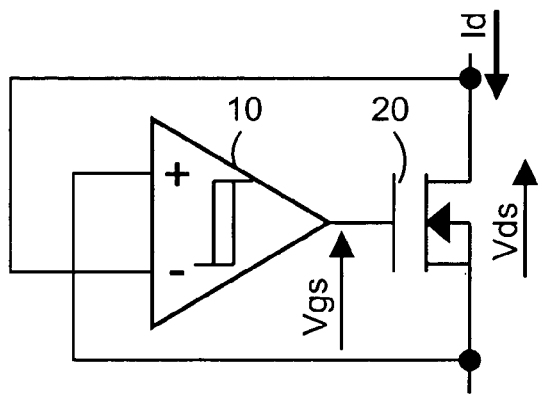
Figure 2B:
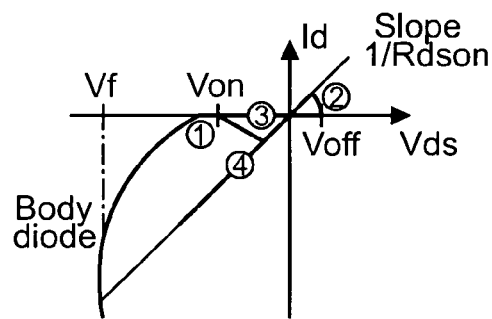
Figure 2C:
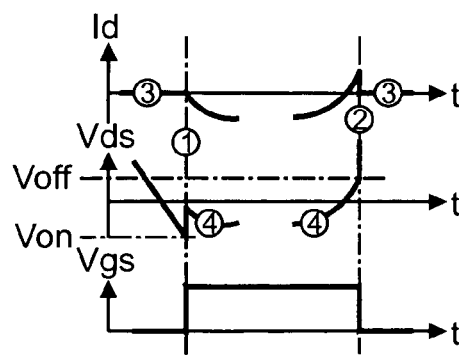

FIG. 2, comprising FIGS. 2A to 2C, shows a known way of implementing the synchronous rectifier MOSFET shown in FIG. 1.

FIG. 2A shows the principle of the circuit, showing one MOSFET; FIG. 2B shows the static operation graphically displaying Id against Vds and FIG. 2C shows waveforms of the circuit of FIG. 2A.

When Vds is positive the body diode of the FET 20 is reverse biased and the MOSFET is off. The operating point is on segment 3 of FIG. 2B. If an AC waveform is applied to the device, the operating point will eventually reach point 1 of FIG. 2B, where the condition Vds=−Von is satisfied. As a result, the output of the Schmidt trigger 10 will go high and the power MOSFET 20 will be turned on. The operating point will move to the segment 4 of FIG. 2B. Eventually the AC waveform will become positive and the operating point will reach point 2. The condition Vds>Voff is met and the Schmidt trigger will turn off the power MOSFET.

A practical application of such a circuit is made difficult because the threshold has to be very tightly controlled, requiring very low offset comparators, in a usually noisy environment. In a typical application, one would use MOSFETs of 1 milliohm for currents around 100 A. It follows that a 1 millivolt offset will create 1A of undesirable negative current at point 2. A root of the problem is that the designer is trying to reproduce a zero current crossing detection by sensing the voltage across a device with practically zero parasitic resistance.

Accordingly, it is an object of the present invention to provide an improved circuit and method for operating a power MOS device as a synchronous rectifier.

SUMMARY OF THE INVENTION

According to the invention, a MOS device operates as a synchronous rectifier, and the apparent Rdson of the power MOS device is increased artificially only when the current is low such that the zero crossing detection becomes simple. According to one embodiment, the power MOSFET is a composite transistor comprised of a small transistor with a high Rdson and a large transistor with a low Rdson.

In another embodiment, an operational amplifier drives the gate of the MOSFET, with the operational amplifier having an offsetting reference voltage at one input so that the drain-source current versus drain-source voltage curve has a threshold allowing zero current crossing detection.

Other objects, features and advantages of the present invention will become apparent from the following detailed description.

BRIEF DESCRIPTION OF THE DRAWING(S)

Figure 3:
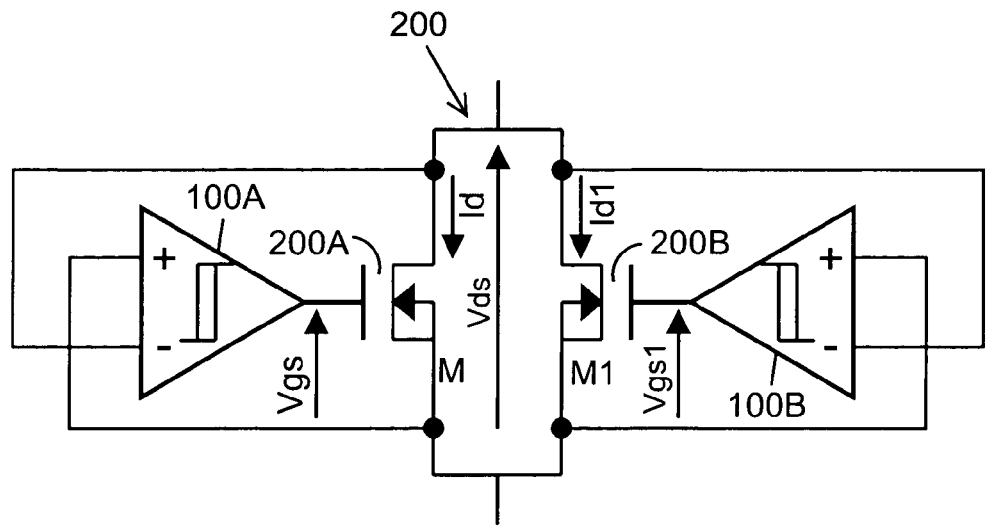
Figure 4A:
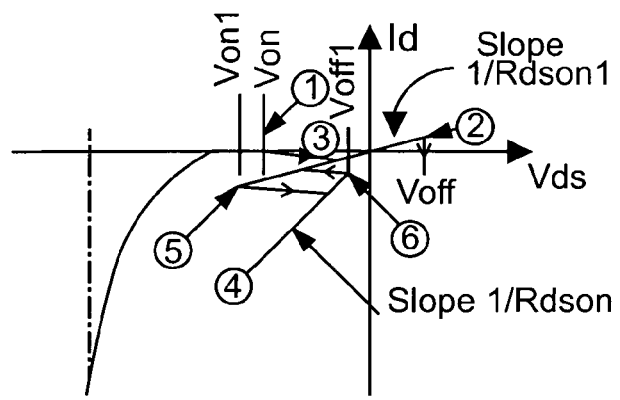
Figure 4B:
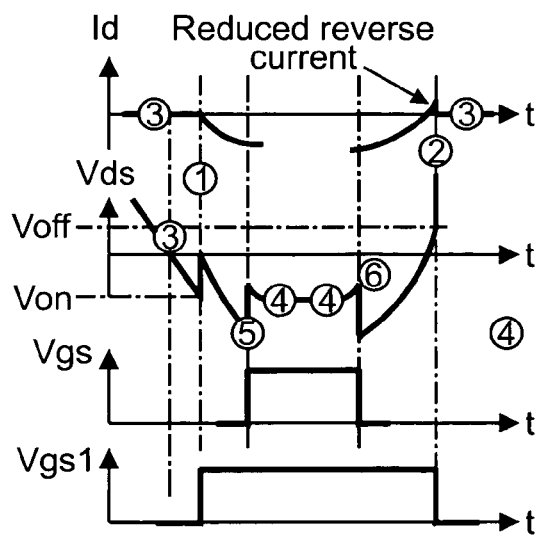
Figure 5A:
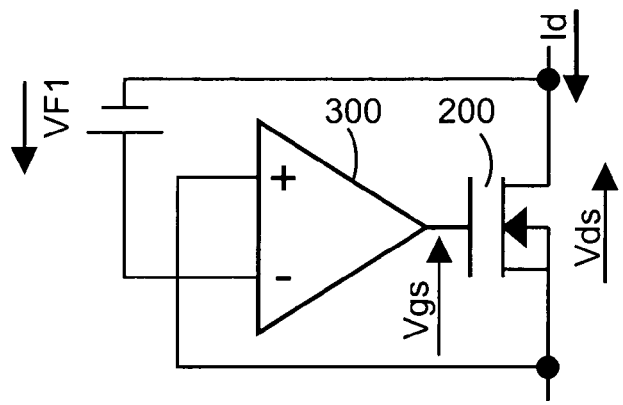
Figure 5B:
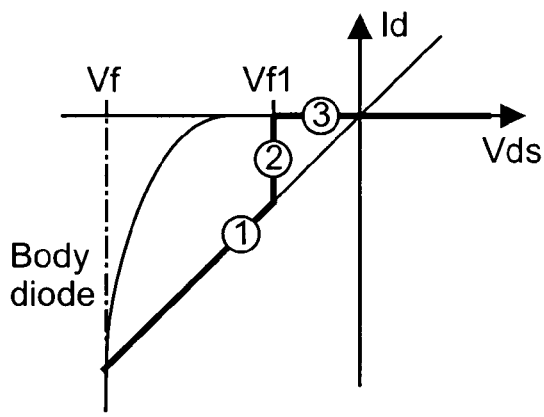
Figure 5C:
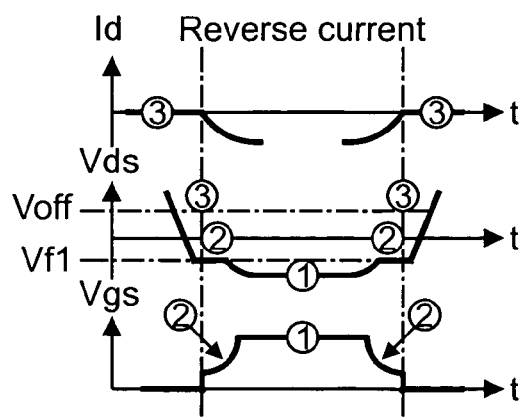
Figure 6:
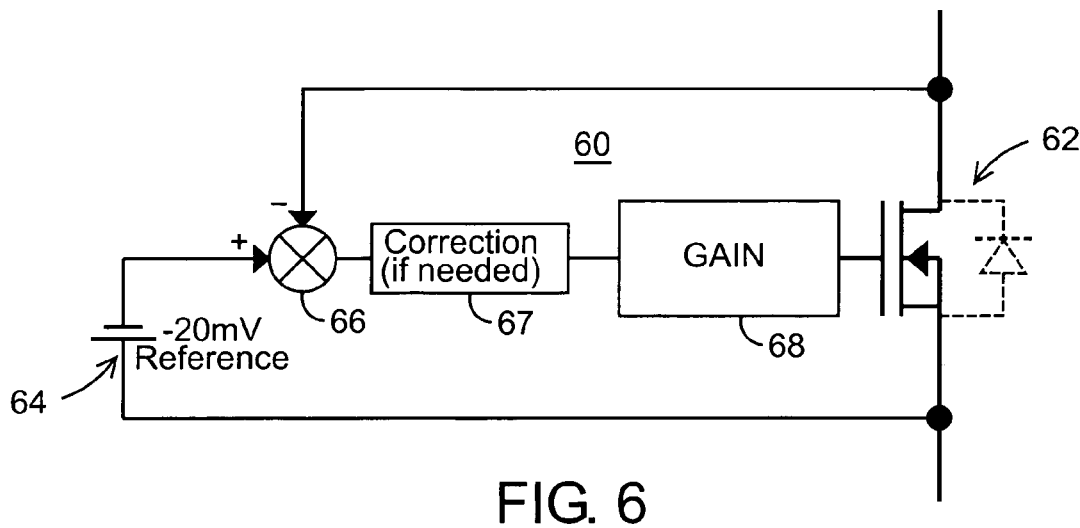
Figure 7:
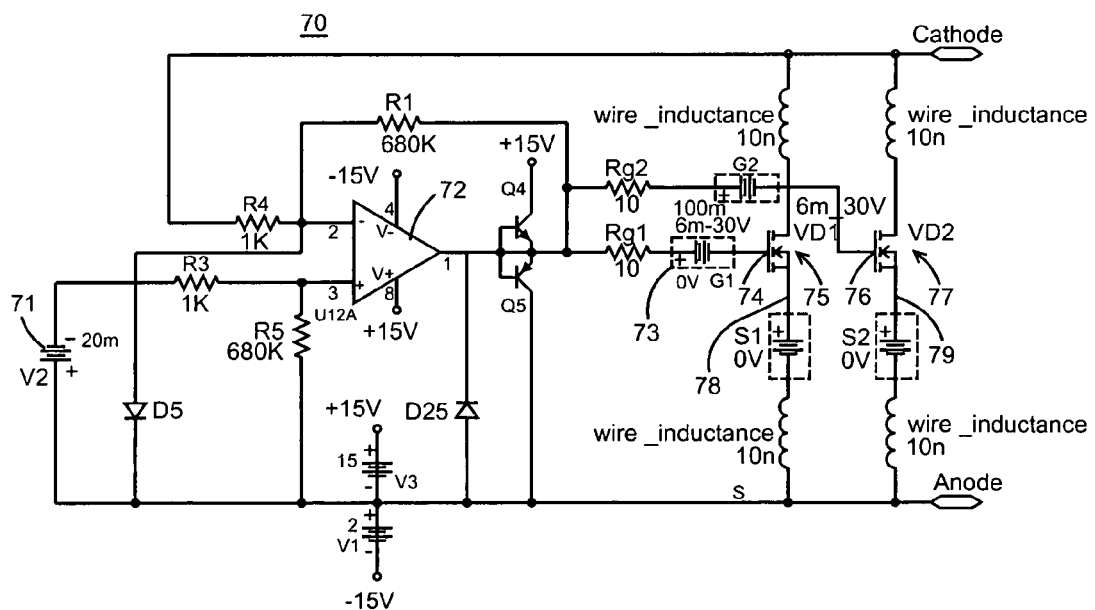

The invention will now be described in greater detail in the following detailed description with reference to the drawings in which:

FIG. 1 shows schematically a known implementation of synchronous rectifiers for rectifying the output of an alternator;

FIG. 2, comprising FIGS. 2A, 2B and 2C, shows a known implementation for driving the MOSFET of the synchronous rectifier, a graph of current Id versus Vds for the synchronous rectifier; and a graph showing Id, Vds and Vgs versus time;

FIG. 3 shows a circuit according to the present invention;

FIG. 4, comprising FIGS. 4A and 4B, show waveforms of FIG. 3;

FIG. 5, comprising FIGS. 5A, 5B and 5C, shows a further implementation including graphs of Vds versus Id and waveforms for Id, Vds and Vgs versus time;

FIG. 6 is a circuit diagram showing closed loop operation according to the present invention; and FIG. 7 is a circuit schematic according to the present invention.

DETAILED DESCRIPTION OF PREFERRED EMBODIMENTS

With reference now to the drawings, the invention will now be described in greater detail. FIG. 3 shows a circuit for implementing the invention. The operation of the circuit shown in FIG. 3 is as follows: The power MOSFET transistor 200 according to FIG. 3 comprises a first large device 200A and a second small device 200B. A first Schmidt trigger 100A drives the gate of device 200A and a second Schmidt trigger 100B drives the gate of device 200B. If an AC waveform is applied to the drain-source path of the device for rectification, the operating point will eventually reach point 1 shown in FIG. 4A where the condition Vds=−Von1 is satisfied. As a result, the output of the Schmidt triggers will go high and the MOSFET 200B will be turned on. If the current increases enough to reach point 5 of FIG. 4A, the main power MOSFET 200A will also be turned on. When the current decreases such that point 6 of FIG. 4A is reached, the main power MOSFET 200A is turned back off. Eventually, the AC waveform will become positive and the operating point will reach point 2 of FIG. 4A. The condition Vds>Voff is satisfied and the Schmidt trigger will turn off the power MOSFET completely (MOSFET 200B goes off). The reverse current at point 2 is Voff/Rdson1 instead of Voff/

Rdson as in the prior art. By properly choosing FETs M and M1, the reverse current can be significantly improved or a higher threshold voltage can be chosen. In many applications, several transistors can be placed in parallel to implement M and M1.

FIG. 5A shows another embodiment in which the gate of the power transistor is driven in a closed loop such that near zero, the Id/Vds curve exhibits a threshold that makes it very easy to detect zero current crossing without practically any offset. In this embodiment, op-amp 300 drives MOSFET 200. As the voltage on Vds (segment 3) of FIG. 5A becomes negative, Vgs begins to increase as shown by segment 2 (see FIG. 5B) to maintain the condition Vds=Vf1. Eventually, the op-amp will saturate in region 1 and the power MOSFET will be fully on. The Vds across the power MOSFET will increase again following the current in segment 1. When the current decreases again and Vds decreases back to Vf1 the op-amp will maintain Vds at Vf1 until Vgs equal 0 after which Vds will increase again as shown by segment 3. Zero current detection can now be performed very easily with an inexpensive, easily implemented large offset comparator.

Referring now to FIG. 6, a Vds voltage control loop 60 is shown. Control loop 60 drives a MOSFET 62 so that it emulates an ideal diode. Control loop 60 describes a generic servo loop with a summing element 66, an optional correction circuit 67 and a gain component 68. The + and – indications in summing junctions 66 represent the non-inverting and inverting inputs of op amp 300 (FIG. 5A). Correction circuit 67 is a frequency compensation network that operates to obtain an appropriate trade off between dynamic response, stability and permanent error in accordance with classical systems control theory. Correction circuit 67 is optional because op amp models are available that typically incorporate internal compensation for use with closed loop control.

One feature provided by the operation of closed loop control 60 is the maintenance of an approximately −20 millivolt voltage drop across power MOSFET 62. Control loop 60 operates on the principle that the gate of MOSFET 62 is driven with closed loop feedback to keep the Vds voltage constant in relation to a −20 millivolt reference 64. MOSFET 62 is off when Vds is positive and is switched completely on when Vds becomes negative through operation of control loop 60. Control loop 60 is a simple closed loop feedback control system that provides a linear feedback control. The operation of MOSFET 62 according to the control provided by control loop 60 obtains synchronous rectification in which MOSFET 62 appears as an ideal diode with smooth operation. Control loop 60 provides operation of MOSFET 62 such that when MOSFET 62 operates in a negative quadrant (FIG. 5B), MOSFET 62 has a non-inverting Vds/Vgs gain. Parameter transitions of MOSFET 62 are smooth and stable so that EMI perturbations are greatly reduced to provide a significant operational enhancement. When the Vds voltage drop exceeds the value of reference 64, control loop 60 ensures that MOSFET 62 is maintained in a fully on state.

Referring now to FIG. 7, a schematic according to an embodiment of the present invention is shown generally as circuit 70. Synchronous rectification circuit 70 provides Vds voltage control for MOSFETs 75, 77 based on a small negative voltage reference 71. The closed loop control provided by circuit 70 preferably has a linear gain and provides a suitable closed loop control technique to ensure that MOSFETs 75, 77 emulate an ideal diode. MOSFETs 75, 77 are shown operated in parallel, but can be combined as a single MOS device with a single control for the gate, for example.

In harsh environments that are subject to high EMI or noise interference, the circuit illustrated in FIG. 7 can be modified to have improved dv/dt immunity. For example, a Vgs comparator can be provided that shorts gate 74, 76 to source 78, 79 when gate voltage is below the MOSFET threshold value. The Vgs comparator compares the value of Vgs to a fixed voltage that is below the threshold voltage of MOSFETs 75, 77. When current in MOSFETs 75, 77 is close to zero, closed loop control tends to pull gate 74, 76 to zero as the closed loop control attempts to maintain Vds voltage equal to the desired value. The Vgs comparator generates a logic signal indicating that Vgs has a low voltage value. The logic signal is used as a safety value to avoid false conduction of MOSFET 75, 77 in a noisy environment by turning on a low impedance path between gate 74, 76 and source 78, 79.

Because of the simplicity and compactness of circuit 70, the closed loop control technique can be implemented with components that are either separate from power MOSFETs 75, 77, or directly embedded in MOSFETs 75, 77 as part of their control function. For example, circuit 70 can be integrated into a component including power MOSFET 75 and/or 77. By providing a closed loop control, the present invention eliminates oscillations that can occur due to the instability or inconsistency in Vds voltage thresholds, such as can occur, for example, based on manufacturing tolerances. Accordingly, the closed loop control can eliminate operational variations in synchronous rectifiers operated according to the present invention, even where the controlled MOSFETs have different threshold values or vary in operation due to component tolerances. By delivering better closed loop performance, Vds transitions become smoother, thereby enhancing component EMI performance.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A synchronous rectifier comprising:
   a MOSFET device; and
   a gate driver for driving the MOSFET device, the MOSFET device comprising first and second MOSFET transistors coupled with their drain-source paths in parallel to receive an alternating current waveform for rectification by the drain- source paths of the MOSFET transistors, the gate driver being connected to the respective gates of the first and second MOSFET transistors, the first transistor having a low Rdson and the second transistor having a high Rdson whereby the apparent Rdson of the MOSFET device is increased when the current through the MOSFET device is below a threshold thereby enabling zero crossing detection.

2. The synchronous rectifier of claim 1, wherein the gate driver comprises a Schmidt trigger having an output coupled to one of the gates of the MOSFET device and having its inputs coupled across the drain-source path of the corresponding MOSFET.

3. The synchronous rectifier of claim 2, wherein the gate driver comprises two Schmidt triggers, one connected to the gate of the first transistor having a low Rdson and a second connected to the gate of the second transistor having a high Rdson.

4. The synchronous rectifier of claim 3, wherein each said Schmidt trigger has its inputs coupled across the drain-source voltage of the corresponding MOSFET device.

5. The synchronous rectifier of claim 2, wherein said Schmidt trigger has a negative input connected to the drain of the MOSFET and a positive input connected to the source of the MOSFET.

6. The synchronous rectifier of claim 4, wherein each said Schmidt trigger has a negative input connected to the drain of the corresponding MOSFET and a positive input connected to the source of the corresponding MOSFET.

7. A method of driving a MOSFET device as a synchronous rectifier comprising:
   increasing the apparent drain to source on-resistance (Rdson) of the MOSFET device when the current flowing in the drain-source path of the MOSFET device is below a threshold level, thereby enabling zero crossing detection; and
   further comprising providing, as said MOSFET device, two MOSFETs with their drain-source paths in parallel, one MOSFET having a high Rdson and the second having a low Rdson.

8. The method of claim 7, further comprising sensing the voltage across the drain-source path of the MOSFET device and switching on the MOSFET with the high Rdson first and as the current increases above an on-threshold level, switching on the MOSFET with the low Rdson.

9. The method of claim 8, further comprising switching the MOSFET with low Rdson off as the current decreases below an off-threshold level and thereafter switching the MOSFET with high Rdson off as the current further decreases.

10. The method of claim 9, wherein the on-threshold and off-threshold levels are different.

11. A method for driving power MOSFETs as a synchronous rectifier comprising the steps of:
   coupling first and second MOSFETs with their drain-source paths in parallel to receive an alternating current waveform for rectification by the drain-source paths, the first MOSFET having a low Rdson and the second MOSFET having a high Rdson whereby the apparent Rdson of the two MOSFETs in parallel is increased when the current through the MOSFETs is below a threshold thereby enabling zero crossing detection.

12. The method of claim 11 further comprising the step of coupling the inputs of a Schmidt trigger across the drain-source path and the output to the gate of one said MOSFET and sensing the drain-source voltage across the MOSFET to determine when to switch the first and second MOSFETs on and off.

13. The method of claim 11, further comprising the step of providing two Schmidt triggers, one having an output connected to the gate of the first MOSFET having a low Rdson and a second having an output connected to the gate of the second MOSFET having a high Rdson.

14. The method of claim 12, wherein said Schmidt trigger has a negative input connected to the drain of the MOSFET and a positive input connected to the source of the MOSFET.

15. The method of claim 13, wherein the inputs of each Schmidt trigger are coupled across the drain-source path of the corresponding MOSFET.

16. The method of claim 15, wherein each Schmidt trigger has a negative input connected to the drain of the MOSFET and a positive input connected to the source of the MOSFET.

* * * * *